United States Patent Office 3,112,290
Patented Nov. 26, 1963

3,112,290
VINYL CHLORIDE POLYMER AND ETHYLENE/VINYL CHLORIDE POLYMER COMPOSITIONS AND PROCESSES
Ival O. Salyer, Dayton, Ohio, assignor to Monsanto Chemical Company, St. Louis, Mo., a corporation of Delaware
No Drawing. Filed Jan. 3, 1961, Ser. No. 80,010
12 Claims. (Cl. 260—45.5)

The present invention is directed to blends of vinyl chloride polymers with ethylene/vinyl chloride copolymers in which vinyl chloride constitutes about 20 to 80% by weight of copolymerized monomers in the ethylene/vinyl chloride copolymer.

It has not been previously known that vinyl chloride polymers are capable of forming compatible blends with solid, high molecular weight ethylene/vinyl chloride copolymers. It has now been found, however, that by choice of solid ethylene/vinyl chloride copolymers having the proper monomer ratios, it is possible to prepare mixtures with vinyl chloride polymers having sufficient compatability to have valuable mechanical properties.

Vinyl chloride polymers, especially homopolymers of vinyl chloride and copolymers of vinyl chloride with not more than 5 to 15 weight percent of other copolymerizable monomers, constitute one of the most important classes of vinyl resins. Because of their inertness, non-flamability, and in general good physical properties, vinyl chloride polymers find many uses. Rigid polyvinyl chloride articles, such as sheets, tubes, rods and the like can be made. It is also possible to make flexible polyvinyl chloride articles by addition of a considerable quantity of plasticizer to the polyvinyl chloride polymer thus allowing preparation of flexible, rubbery compositions permitting the production of garden hose, film, and the like therefrom.

The many valuable properties of vinyl chloride polymers are well known and these polymers have become very important commercially. Many of the vinyl chloride polymers are characterized as tough, hard and rigid plastics, but some of these polymers are not easily processed in conventional operations because of their thermal plasticity characteristics. It is known that the processability of vinyl chloride polymers can be improved by the incorporation of a plasticizer into the polymer, but the resulting composition is also softened and weakened somewhat, thereby limiting the end use of the composition to non-rigid applications.

The ordinary polyvinyl chloride of commerce is a hard, rigid, chemically-resistant, thermoplastic material; however, this material is characterized by relatively poor impact resistance which precludes its use in applications requiring the withstanding of heavy blows or shocks. It is a particular and special object of the present invention to improve the impact resistance of the rigid vinyl chloride resins. It is another and further object to provide flame resistant, flexible vinyl chloride resins polymerically plasticized with compatible, solid, high molecular weight polymeric plasticizers.

It is a further object of the present invention to improve the processing characteristics of polyvinyl chloride resins, particularly the processing characteristics of polyvinyl chloride resins to be used in the preparation of rigid articles. In the past it has not been practicable to use the available higher molecular weight polyvinyl chloride resins in the manufacture of unplasticized, rigid articles due to the difficulty of milling, calendering, or extruding such high molecular weight highly rigid materials in their unplasticized, rigid form. When milled on rolls, unplasticized polyvinyl chloride sheets are not maintained but rather are subject to severe tearing. It is very difficult to injection mold polyvinyl chloride successfully because of its flow characteristics and the fact that the required molding temperatures are necessarily so high as to cause significant decomposition of the polymer. It would be highly desirable to provide polyvinyl chloride of improved flowability and processing characteristics while at the same time preserving the inherent fire resistance present in polyvinyl chloride resins. At present it is necessary to use such a large amount of plasticizer, which is in itself flammable, that the polyvinyl chloride resinous composition to a great extent loses its inherent fire retardant characteristics.

It has now been discovered, however, that it is possible to improve the processing characteristics of polyvinyl chloride resins, even of those having weight average molecular weights of 100,000 to 500,000 or higher (as measured by light scattering), while retaining an even enhancing the inherent fire resistance of the polyvinyl chloride resins by the incorporation therein of certain ethylene/vinyl chloride copolymers of suitable compatability as disclosed herein, and still prepare highly rigid articles therefrom.

The terms "vinyl chloride polymer" and "polymer of vinyl chloride" as used herein are intended to include homopolymers of vinyl chloride i.e., polymers prepared by subjecting to polymerization a monomeric material consisting of vinyl chloride as the sole polymerizable constituent, and copolymers of vinyl chloride with small amounts, e.g., 5% to 15% by weight of other ethylenically unsaturated monomers copolymerizable therewith, e.g. vinyl acetate, vinylidene chloride, acrylonitrile, etc.

The terms "blend" and "polyblend" are synonymously used herein in a broad sense to include both mechanical blends of preformed vinyl chloride polymers with preformed ethylene/vinyl chloride copolymers, and polymerization blends prepared by polymerizing monomeric vinyl chloride in the presence of preformed ethylene/vinyl chloride copolymers. Thus, preformed vinyl chloride polymer and preformed ethylene/vinyl chloride copolymer can be brought together into intimate admixture by any suitable mechanical means, such as by milling on cold or heated mill rolls; mixing in a Banbury mixer; or mixing emulsions, suspensions, or dispersions of the two polymers and coagulating same. In like fashion an ethylene/vinyl chloride copolymer can be incorporated in monomeric vinyl chloride and the resulting material subjected to polymerization. For best results in the preparation of polymerization blends such polymerization should be carried to a high conversion, such as greater than 50% conversion to high molecular weight vinyl chloride polymer. In preparing such a "polymerization blend," the ethylene/vinyl chloride copolymer should be thoroughly and intimately dispersed in the monomeric vinyl chloride material prior to polymerization. It is believed highly probable that in the practice of the embodiments of this invention involving polymerization of vinyl chloride in the presence of preformed ethylene/vinyl chloride copolymers, a certain amount of interpolymerization occurs between vinyl chloride and ethylene/vinyl chloride copolymer molecules, with the resultant formation of what can be called a graft copolymer, although it is by no means certain and is even doubtful that all molecules of ethylene/vinyl chloride copolymer become united with one or more vinyl chloride monomer units. However the invention is not to be limited by any theory of particular reaction mechanism or product structure.

In order to obtain compatible blends of vinyl chloride resins with substantial amounts of high molecular weight ethylene/vinyl chloride copolymers, it is essential to have sufficient vinyl chloride copolymerizate present in the ethylene/vinyl chloride copolymer to make the materials compatible. If the materials are not sufficiently compatible, the mixture is cheesy in appearance and is deficient in tensile strength and other important properties It is generally necessary to employ copolymers having the vinyl chloride monomer present in at least about 20 to about 80 parts by weight per 100 parts by weight of the total copolymer in order to have sufficient compatibility in the blended composition, although the ratio of vinyl chloride to ethylene in the ethylene/vinyl chloride copolymer will depend to some extent upon the amount of the ethylene/vinyl chloride copolymer employed in the vinyl chloride resin polyblend. It will also be realized that the copolymerizate vinyl chloride will generally be present after copolymerization in the ethylene/vinyl chloride copolymer in slightly lesser proportions than it is initially supplied for the copolymerization reaction, for example about 10 to 20% lesser, particularly when vinyl chloride monomer is used in minor proportions. On the basis of monomer products actually present in the copolymer after polymerization, it is possible to prepare useful, compatible poly blends of vinyl chloride polymers with solid ethylene/vinyl chloride copolymers in which the vinyl chloride constitutes from about 20 to about 80 parts per 100 parts of ethylene/vinyl chloride copolymer, all parts being by weight. The preferred range of vinyl chloride in the ethylene/vinyl chloride copolymer is 55 to 75 parts by weight per 100 parts by weight of copolymer.

The vinyl chloride resins employed herein will generally have weight average molecular weights ($M_w$) in the range of about 50,000 to about 500,000, although higher or lower molecular weight vinyl chloride resins are applicable to some extent in the present invention. The present invention is of particular value in the preparation of rigid blending materials from polyvinyl chloride resins having weight average molecular weights greater than about 100,000. The molecular weights in question are those referred to as $M_w$, and are determined by light scattering in methyl ethyl ketone solution.

Usually these polyvinyl chloride polymers will have number average molecular weights ($M_n$) of about 25,000 to about 150,000, as determined by osmometric pressure rise in cyclohexanone, with the preferred range of polymer having $M_n$ values of about 50,000 to about 100,000. The polyvinyl chloride polymer, as described herein, can be produced by any of the known vinyl chloride polymerization techniques from monomeric materials comprising vinyl chloride, either with or without small amounts, e.g., 5%–15% by weight of other monoolefinically unsaturated monomers present.

One of the most common of the said techniques is mass polymerization wherein the only material present in the reaction mixture is the monomer (or monomers) plus any catalyst and any modifier that may be used to effect the desired molecular weight, plus ethylene/vinyl chloride copolymer if it is to be incorporated during the polymerization, and no added solvent or reaction medium is present. Suitable catalysts for the mass polymerization technique are those which promote generation of free radicals, e.g., peroxide and azo catalysts. By way of example are benzoyl peroxide; diacetylperoxide; dimethylphenylhydroperoxy methane; $\alpha,\alpha'$-azo-bisisobutrylnitrile; etc.

Another satisfactory polymerization technique is solvent polymerization which is similar to mass polymerization except that a solvent for the monomer and/or polymer is also present during the polymerization. Use of a solvent generally results in a lower molecular weight polyvinyl chloride resin.

The polymerization of vinyl chloride, with or without relatively small amounts of comonomers, can also be effected advantageously by suspension or emulsion polymerization techniques. Both suspension and emulsion polymerization involve the use of a non-solvent for the monomer and the polymer, but in the suspension technique the particles of monomer (and ultimately of the polymer) are comparatively large, while in the emulsion procedure the particles are much smaller and the final product is a stable latex. A suitable method for effecting the suspension polymerization of vinyl chloride is to employ water and a small amount of an added suspending agent, such as a vinyl acetate-maleic anhydride copolymer, or certain phosphates, with a louroyl peroxide catalyst and a limited amount of an emulsifier such as glyceryl monostearate. A suitable emulsion polymerization procedure is to employ water along with potassium persulfate catalyst, any suitable emulsifier, and a polymerization modifier. Emulsion and suspension polymerizations can be effected at temperatures which are chosen in accordance with the particular catalyst used, but which may for example be from 40° to 60° C. although higher or lower temperatures can be employed.

Depending upon the particular catalyst system and polymerization temperature selected, polyvinyl chloride can be produced which contains more than the normal amount of crystallization and is highly stereospecific or syndiotactic. These more highly crystalline polyvinyl chloride polymers are also suitable and likewise benefitted by polyblending with ethylene/vinyl chloride copolymers. For example by polymerizing vinyl chloride monomer at temperatures well below 0° C. (e.g. −40° C.) with an ionic catalyst, as is known in the art, "syndiotactic polyvinyl chloride" is attained. Of course, "syndiotactic polyvinyl chloride," prepared by any suitable process, is enhanced especially in its impact strength and toughness properties by polyblending with ethylene/vinyl chloride copolymer.

The materials blended with vinyl chloride resins in the practice of the present invention are copolymers of ethylene with vinyl chloride. As previously mentioned the ethylene/vinyl chloride copolymers will contain from about 20 to about 80 parts by weight of vinyl chloride monomer, per 100 total parts by weight of ethylene/vinyl chloride copolymer with the more preferred range of vinyl chloride being about 55 to about 75 parts by weight. These ethylene/vinyl chloride copolymers, having 20 to 80 parts by weight of vinyl chloride, can be blended with poly vinyl chloride resins, within the previously mentioned molecular weight ranges, to produce either rigid polyvinyl chloride polymers having a high-impact resistance, or polymerically plasticized polyvinyl chloride resinous compositions having the improved fire resistant properties.

Of course, the rigid polyvinyl chloride-ethylene/vinyl chloride polyblends are likewise fire-resistant. The improvement in fire resistance is more markedly noticeable in the case of the highly polymerically plasticized polyblend compositions, however, because of the conventional use of combustible monomeric plasticizers to attain a high degree of flexibility in polyvinyl chloride resins. Such combustible plasticizers are employed in large amounts and substantially negate the inherent fire resistance of the polyvinyl chloride resin.

The ethylene/vinyl chloride copolymers useful in the present blended compositions will generally have number average molecular weights ($M_n$) varying from about 5,000 to 100,000, or even as high as 500,000. The preferable number average molecular weight range is between about 10,000 to about 50,000.

Generally speaking the ethylene/vinyl chloride copolymers employed herein will have weight average molecular weights ($M_w$) (as determined from measurements of light scattering in solution), of at least 50,000 to 1,000,000, or even higher, although somewhat lower molecular weight copolymers, such as those of 20,000 to 200,000 can also be employed.

The $M_w/M_n$ ratio of the applicable copolymers can be as high as 20 to 1 or even higher, but preferably is less than 15 to 1 ranging on down to 2 to 1 or less. A suitable $M_w/M_n$ ratio is about 10 to 1. It will also be possible to employ ethylene/vinyl chloride copolymers of higher weight average molecular weights up to 2,000,000 or greater.

The numerically designated molecular weights referred to may also be determined in the conventional manner on the basis of the intrinsic viscosity of the polymer in xylene solution as described in the Journal of Polymer Science, 23, 887, 1957. In this publication, the intrinsic viscosity is converted to molecular weight by means of the equation:

$$(N) = 1.05 \times 10^{-3} \ (M_w^{0.63})$$

By this calculation the ethylene/vinyl chloride copolymers referred to above would include those having intrinsic viscosities from 0.5 to 5.0. Converted to molecular weight, these intrinsic viscosities include broadly ethylene/vinyl chloride copolymers of 18,000 to 700,000 molecular weight.

Although both the ethylene/vinyl chloride copolymer and vinyl chloride resin are preferably solid when polyblends are formed by mechanical blending, solutions, suspensions, or emulsions may also be used. The term "solid" as used herein with respect to the ethylene/vinyl chloride copolymer is not intended to imply that under no conditions are the copolymers capable of viscous flow, but is to be understood as meaning that the copolymers are definitely high molecular weight solids as contrasted with free flowing liquids.

Ethylene/vinyl chloride copolymers suitable for use in the present invention can be prepared by persulfate catalyzed copolymerization of ethylene and vinyl chloride under high pressure, such as 20,000 to 30,000 p.s.i. Various catalysts such as potassium persulfate, $K_2(S_2O_4)_8$, oxygen, or azo-type catalysts can be used at concentrations of about 15 to 150 weight parts per million based on the monomer feed, and the polymerization can be effected at room temperature or higher temperatures. However, the polymerization catalyst can also be of the oil soluble type, e.g., benzoyl peroxide, di-tert-butyl peroxide, etc., whenever the polymerization is carried out in mass or in suspension. Ethylene/vinyl chloride copolymers prepared by any suitable polymerization process can be employed in the practice of the present invention.

The ethylene/vinyl chloride copolymers can be prepared in a batch reaction, a series of batch reactions, or in a continuous reaction such as in a tubular reactor.

As previously indicated the ethylene/vinyl chloride copolymers as defined above can be blended, either mechanically or chemically, with the polyvinyl chloride resins, as defined above, to produce both relatively rigid, high-impact resistant compositions, and highly-flexible, polymerically plasticized, fire-resistant polymer compositions.

In the rigid polyblends of the present invention (wherein the impact resistance of poly vinyl chloride is substantially improved), the ethylene/vinyl chloride copolymer is ordinarily employed in minor proportions by weight. Since it is desirable to retain the valuable rigid properties of the vinyl chloride resinous component thereof, the ethylene/vinyl chloride copolymer component will not ordinarily be employed in amounts of more than 5 to 30 parts by weight as compared to the 100 total parts by weight of the polyvinyl chloride-ethylene/vinyl chloride polyblend compositions. The more preferred compositions will contain 10 to 20 parts by weight of ethylene/vinyl chloride copolymer on the basis of 100 parts by weight total polymer in the polyblend.

In the flexible blends of the present invention, the ethylene/vinyl chloride copolymer is ordinarily employed in major proportions by weight. In these flexible blends the ethylene/vinyl chloride copolymer is the polymeric plasticizer component. Customarily vinyl chloride resins are plasticized with materials which are by their very nature combustible, and therefore such plasticizers greatly reduce the inherent fire resistant properties of polyvinyl chloride resins. However, by polymerically plasticizing the polyvinyl chloride resins with the ethylene/vinyl chloride copolymers (as defined previously), the inherent fire-retardant properties of the polyvinyl chloride resins will not be destroyed, but will in fact be enhanced. The ethylene/vinyl chloride copolymer component (plasticizer) will incorporate more fire resistance into the flexible blends than would be present in polyvinyl chloride resins compounded with a combustible plasticizer.

The invention in its broadest aspects is not departed from by blending vinyl chloride polymers with solid ethylene/vinyl chloride copolymers made by providing in addition to proper proportions of ethylene and vinyl chloride in the copolymer, other monomeric materials capable of entering into the polymerization reaction. Examples of such comonomers are vinyl acetate, methyl acrylate, methyl methacrylate, vinyl oxyethanol, etc. Thus, other unsaturated organic compounds can be used as comonomers along with the ethylene and vinyl chloride, so long as the desired properties are not deleteriously affected; the amount of additional comonomer can generally be chosen so as to retain the advantageous results of the copolymerization of particular proportions of vinyl chloride and ethylene, despite the expected effect upon other polymer properties. It is preferred, however, to employ copolymers consisting of, or consisting essentially of ethylene and vinyl chloride copolymerizate.

In order to carry out the principal object of the present invention (which is the production of rigid, high-impact resistant vinyl chloride resin blends), solid ethylene/vinyl chloride copolymers containing about 20 to 80 parts by weight of vinyl chloride per 100 parts by weight of copolymer are employed in the blends. The rigid vinyl chloride blends of the present invention are characterized by impact strengths (as measured by the Izod test) of well above 2 foot pounds per inch of notch, preferably above 5 foot pounds, and often even above 15 pounds per inch of notch. The rigid blends are further characterized by other properties characteristic of rigid, resinous materials as compared to elastomeric, rubbery materials. For example, the rigid blends ordinarily have fairly low percentages of tensile elongation at yield, generally being less than 25% and often less than 10% or even 5%. The rigid blends of the present invention are also characterized by high flexural strength and fairly high modulus in tension.

While the present invention particularly concerns polyblend compositions employed in making rigid or semi-rigid polyvinyl chloride articles, it also includes within its scope blended polyvinyl chloride compositions containing relatively large amounts of solid ethylene/vinyl chloride copolymer, such that it permits the production of flexible or rubbery polymerically plasticized articles. In effect, when ethylene/vinyl chloride copolymers are employed in which the vinyl chloride is present in major amounts, the stated copolymers function as a polymeric plasticizer in the polyblends with polyvinyl chloride. The use of the foregoing copolymers as polymeric plasticizers results in clear, transparent, plasticized polyvinyl chloride compositions. The above referred to ethylene/vinyl chloride polymeric plasticizers are superior to monomeric plasticizers because of their fire resistance, low volatility, low extractability, and good age resistance, as well as in the particular mechanical properties of the plasticized compositions. The polymeric ethylene/vinyl chloride copolymers containing 50% or more of vinyl chloride copolymerizate are also superior to most other polymeric plasticizers in that, when blended with polyvinyl chloride resins, they produce flexible polyvinyl chloride resinous compositions of enhanced fire resistance which are sufficiently compatible that they do not break down or "delaminate" even in such procedures as injection molding. Thus these polyvinyl chloride resins which are polymerically plasticized with the above indicated ethylene/vinyl chloride copolymers exhibit fine coherence even under vigorous processing conditions. Moreover, the foregoing blends are age resistant and have good color retention properties compared to polyvinyl chloride compositions plasticized with ordinary polymeric plasticizers.

Any substantial amount of the aforementioned ethylene/vinyl chloride polymeric plasticizers will, of course, plasticize polyvinyl chloride to a certain extent. However, a significant amount, say 20% by weight will be required to have any plasticizing effect as indicated by lowering of the brittle temperature ($T_f$). Amounts of about 50% to about 80% or more by weight (based on the total composition of ethylene/vinyl chloride polymeric plasticizer and polyvinyl chloride resin) will generally be employed, and the amount of ethylene/vinyl chloride will preferably constitute 60 to 70% by weight on such basis. In order to have polyvinyl chloride resinous materials flexible at room temperature, as characterized by a flexural strength to yield of less than 2000 p.s.i., it will ordinarily be necessary to use more than 30% by weight of the ethylene/vinyl chloride polymeric plasticizer, preferably about at least 50% by weight based on the total polymer composition. As polymeric plasticizer it is preferred to utilize an ethylene/vinyl chloride copolymer of 55% to 75% vinyl chloride content.

It will be realized that ordinary monomeric plasticizers for polyvinyl chloride can be used in addition to the ethylene/vinyl chloride as a relatively small portion of the total plasticizer content in the foregoing compositions composed of up to 80% plasticizer by weight, and that such polyvinyl chloride polyblend compositions will in general retain the valuable properties characteristic of those using ethylene/vinyl chloride as sole plasticizer, although there will be some proportionate loss in such properties as low volatility, low extractability, age resistance, fire resistance, etc. It will generally be desirable that at least 25% by weight of the plasticizer be the ethylene/vinyl chloride polymer plasticizer alone, and more preferably 75% by weight of the plasticizer should be ethylene/vinyl chloride. Representative examples of monomeric plasticizers suitable for inclusion in small amounts with ethylene/vinyl chloride in the polyblend compositions include: dioctyl phthalate; dioctyl adipate; tricresylphosphate; dioctyl sebacate; etc.

Thermal stabilizers, fillers, dyes, pigments, other polymers, and additives customarily employed to secure tailor made properties can be employed in the polyvinyl chloride-ethylene/vinyl chloride polyblends of the present invention. Those skilled in the art, having had the benefit of the present disclosure will be able to choose by simple tests suitable proportions of a particular vinyl chloride resin and a particular ethylene/vinyl chloride copolymer to give a blend having characteristics desired for a particular commercial use.

The polyvinyl chloride-ethylene/vinyl chloride polymeric blends of this invention are useful in making compression molded and injection molded articles, and can also be used in other forms, e.g. as flexible, fire-resistant films, surface coatings, fibers and monofilaments, hose (piping), sheets, etc., and these manufactures can be prepared by procedures well known in the art.

The following example provides details of certain preferred embodiments of the present invention. The data are to be taken as exemplary, and the invention in its broadest aspects is not limited to the particular conditions, proportions, and materials set forth therein.

*Example*

Samples of ethylene/vinyl chloride copolymer having ethylene to vinyl chloride monomeric ratios as indicated below in parts by weight were blended in various proportions with a polyvinyl chloride polymer having the trade name "Opalon 300." The blending was carried out by milling at about 150° C. on 6 inch by 12 inch Thropp rolls for a sufficient period of time to render the blend homogeneous throughout. The materials were stabilized by incorporation therein of 2% of a commercial polyvinyl chloride stabilizer, Thermolite 31 (a dibutyl tin sulfur compound made by the process described in U.S. Patent 2,648,650). The resulting blended compositions, after homogenization on the mill roll, were sheeted and stripped from the mill roll. The sheets were cooled to room temperature and cut into shapes approximating the configuration of the mold in which the compression molded specimens were to be made. The material was molded between pressed polished plates using a 30 ton Motch and Merriweather press. The samples were first given a 3 minute pre-heat at a hydraulic pressure of approximately 50 p.s.i.g., and then heated for a period of about 5 minutes with a final temperature of approximately 350° F. and a final hydraulic pressure of 1000 p.s.i.g. At the end of this time, the specimens were cooled to room temperature with water and removed from the press. The desired physical test specimens were then cut from the compression molded material for the determination of various physical properties of the blends. The physical properties of the various blends are reported in the table below. These physical properties were determined according to the standard ASTM procedures, more specifically, the Notched impact strength was determined by the Izod method as set forth in ASTM D–256–47–T; the tensile properties were determined according to ASTM D–882–46; and the Clash-Berg data were determined according to ASTM D–1043–51. In the table the polyvinyl chloride resin will be abbreviated by "PVC" and the ethylene/vinyl chloride copolymer will be indicated by "E/VCl."

| PVC-E/VCl ratio | E/VCl ratio | Impact strength ft.lbs./in. of Motch | Tensile Properties | | | | Clash-Berg data | | | 25° C. Mod. (p.s.i.) |
|---|---|---|---|---|---|---|---|---|---|---|
| | | | Strength (p.s.i.) | | Elongation (%) | | | | | |
| | | | Yield | Failure | Yield | Failure | $T_f$ ° C. | $T_{2000}$ (° C.) | S.R. (° C.) | |
| 90/10 | 45/55 | 3.89 | 5,686 | 4,471 | 6.0 | 33.0 | +73.0 | +91.5 | 18.5 | >135,000 |
| 85/15 | 45/55 | 3.27 | 4,604 | 3,968 | 6.0 | 20.0 | +68.0 | +89.0 | 21.0 | >135,000 |
| 80/20 | 45/55 | 1.15 | | 2,535 | | 4.2 | +57.0 | +86.5 | 29.5 | >135,000 |
| 80/20 | 22/78 | 2.08 | 3,749 | 3,682 | 6.1 | 27.0 | +50.5 | +85.0 | 34.5 | >135,000 |
| 70/10 [1] | 22/78 | [4] 12.69 | 1,666 | 3,274 | 6.7 | 267.0 | +14.0 | +52.0 | 38.0 | 70,000 |
| 70/20 [2] | 22/78 | [5] 13.16 | 3,120 | 2,746 | 5.0 | 80.0 | +45.0 | +71.5 | 26.5 | 270,000 |
| 70/30 | 22/78 | 22.70 | 2,512 | 2,531 | 9.0 | 33.0 | +17.5 | +85.0 | 68.5 | 125,000 |
| 50/50 | 90/10 | 0.37 | | 1,134 | | 3.0 | −10.0 | +89.0 | 99.0 | 60,000 |
| 50/50 | 65/35 | 2.42 | 323 | 264 | 9.1 | 2.2 | −31.5 | +50.5 | 82.0 | 14,000 |
| 50/50 | 22/78 | [4] 13.63 | 763 | 1,173 | 13.1 | 104.0 | +5.0 | +75.5 | 70.5 | 20,500 |
| 20/80 | 90/10 | 4.51 | 1,095 | 1,240 | 10.7 | 96.0 | −25.5 | +90.0 | 115.5 | 37,000 |
| 20/80 | 70/30 | 5.35 | 496 | 635 | 9.9 | 164.0 | −34.0 | +58.0 | 92.0 | 11,500 |
| 20/80 | 65/35 | 3.39 | 259 | 261 | 16.0 | 468.0 | −37.0 | +41.5 | 78.5 | 5,400 |
| 20/80 | 22/78 | ([4]) | | 723 | | 467.0 | +1.5 | +18.5 | 17.0 | 2,000 |
| 100/0 [3] | | 0.60 | 8,508 | 6,983 | 7.0 | 103.0 | +75.0 | +91.5 | 16.1 | >135,000 |

[1] Blend contained 20 parts by weight of dioctyl phthalate.
[2] Blend contained 10 parts by weight of dioctyl phthalate.
[3] This run is the PVC resin (Opalon 300) without any E/VCl.
[4] No break.
[5] Incomplete break.

In general, the data in the above table show that the improvement in impact strength obtained by the addition of ethylene/vinyl chloride copolymer to the polyvinyl chloride resin is not at the expense of the rigidity of the vinyl chloride polymer; that is, the stiffness of the vinyl chloride polymer, is not reduced to an unacceptable level by the presence of the ethylene/vinyl chloride copolymer in the polyvinyl chloride composition. The Clash-Berg modulus data is a measure of the stiffness of the plastic specimens as a function of temperature. The brittle temperature ($T_f$) is the temperature at which the stiffness modulus is 135,000 p.s.i., and the rubber temperature ($T_{2000}$) is the temperature at which the stiffness modulus is 2000 p.s.i. The stif-flex range (SR) is determined by difference.

It will be observed from the data in the table that the addition of ethylene/vinyl chloride copolymer to the polyvinyl chloride composition improved the Izod impact strength of the polyvinyl chloride resin substantially. This is especially significant in the rigid polyblend compositions as a combination of rigidity with good impact strength is highly desired. Moreover, this enhancement of impact strength is obtainable by the addition of relatively small amounts of the ethylene/vinyl chloride copolymer. For example the addition of 10 parts by weight of ethylene/vinyl chloride copolymer to 90 parts by weight of the polyvinyl chloride resin raised the impact strength from 0.6 to 3.89 ft. lbs. thus constituting approximately a 550% improvement in impact strength of the polyvinyl chloride.

An inspection of the brittle temperature ($T_f$) data shows that the PVC–E/VCl poly blend compositions display improved brittle temperatures in general. Thus this indicates that the polyblend compositions can be used at lower temperatures without breaking, and hence offer advantages for use at temperatures below which polyvinyl chloride resins, per se, will break.

The poly blends of the instant invention also possess an increased stif-flex range. The stif-flex range is important in determining end uses of polymer materials because it is an indication that the change in physical characteristics of the material will be gradual over a wide temperature range, and that failure of the material will not occur suddenly or immediately upon a change in temperature. The polyvinyl chloride-ethylene/vinyl chloride poly blends of this invention show substantial improvement in stif-flex range over polyvinyl chloride resins alone, thus demonstrating an increased adaptability to uses over a fairly wide temperature range while at the same time they possess good tensile properties and greatly improved impact strength.

The rubber temperature ($T_{2000}$) shows that the polyvinyl chloride poly blends of the present invention have heat resistance values which are in general at least as good as that of polyvinyl chloride resin alone. This is an important factor in polymer evaluation as above this temperature the material has no weight or load bearing characteristics. It is therefore desirable to obtain a polymer having a high rubber temperature since such a blend will have greater uses in household items which must be cleaned and are therefore necessarily in constant contact with hot water. The polyblend compositions disclosed herein display good rubber temperature characteristics.

As regards the tensile properties of the polyvinyl chloride-ethylene/vinyl chloride poly blends, the highly plasticized, elastomeric, low modulus polyblend compositions will have lower tensile strengths, but higher elongations, than the rigid formulations. This is characteristic of rubber systems generally.

While the invention has been described herein, with particular reference to various preferred embodiments thereof, it will be appreciated that variations from the details given herein can be effected without departing from the invention in its broadest aspects. It is to be understood therefore that changes and variations can be made without departing from the spirit and the scope of the invention.

I claim:

1. A blend comprising different polymers, said blend including a vinyl chloride polymer with an ethylene/vinyl chloride copolymer.

2. A blend of a vinyl chloride homopolymer with an ethylene/vinyl chloride copolymer.

3. The blend of claim 2 wherein the vinyl chloride homopolymer contains measurable crystallinity, and is syndiotactic.

4. A blend of a vinyl chloride homopolymer with a minor amount of an ethylene/vinyl chloride copolymer, said copolymer comprising about 10 parts to about 80 parts of vinyl chloride per 100 parts of copolymer, all parts being by weight.

5. An intimate admixture of from 20 to 95 parts by weight of a vinyl chloride homopolymer with from 5 to 80 parts by weight of an ethylene/vinyl chloride copolymer, the said copolymer comprising about 20 to about 80 parts by weight of vinyl chloride per 100 parts by weight of copolymer.

6. A rigid, shock-resistant blended composition comprising about 70 to about 95 parts by weight of a vinyl chloride homopolymer and about 5 to about 30 parts by weight of an ethylene/vinyl chloride copolymer, the said copolymer comprising about 55 to about 75 parts by weight of vinyl chloride per 100 parts by weight of copolymer.

7. The composition of claim 6 wherein the vinyl chloride homopolymer has a number average molecular weight greater than 10,000.

8. A flexible, fire-resistant, polymerically-plasticized blended composition comprising about 20 to about 50 parts by weight of a vinyl chloride homopolymer and about 50 to about 80 parts by weight of an ethylene/vinyl chloride copolymer, the said copolymer comprising about 55 to about 75 parts by weight of vinyl chloride per 100 parts by weight of copolymer.

9. The method of preparing vinyl chloride polymeric compositions which comprises forming an intimate admixture of a vinyl chloride polymer with an ethylene/vinyl chloride copolymer wherein the said copolymer contains about 10 to about 80 parts by weight of vinyl chloride per 100 parts by weight of copolymer.

10. The method of preparing vinyl chloride polymeric compositions which comprises incorporating an ethylene/vinyl chloride copolymer into monomeric vinyl chloride and polymerizing the vinyl chloride in the presence of said copolymer to a number average molecular weight of at least 10,000.

11. The method of claim 10 wherein the ethylene/vinyl chloride copolymer is thoroughly and intimately dispersed in the monomeric vinyl chloride material prior to polymerization.

12. The method of claim 9 in which solid vinyl chloride polymer is mechanically admixed with solid ethylene/vinyl chloride copolymer.

References Cited in the file of this patent
UNITED STATES PATENTS

| | | |
|---|---|---|
| 2,213,423 | Wiezevich (Gaylor) | Sept. 3, 1940 |
| 2,543,229 | Chapman | Feb. 27, 1951 |
| 2,563,631 | Young et al. | Aug. 7, 1951 |
| 2,611,153 | Semegen | Sept. 23, 1952 |
| 2,837,496 | Vandenberg | June 3, 1958 |